(No Model.) 4 Sheets—Sheet 1.

G. BEEKMAN.
COTTON HARVESTER.

No. 436,770. Patented Sept. 23, 1890.

WITNESSES:
H. P. Parker
J. Hindmahyde

INVENTOR
Gerard Beekman
BY C. Wyllys Betts
ATTORNEY (No Model.) 4 Sheets—Sheet 2.
G. BEEKMAN.
COTTON HARVESTER.
No. 436,770. Patented Sept. 23, 1890.
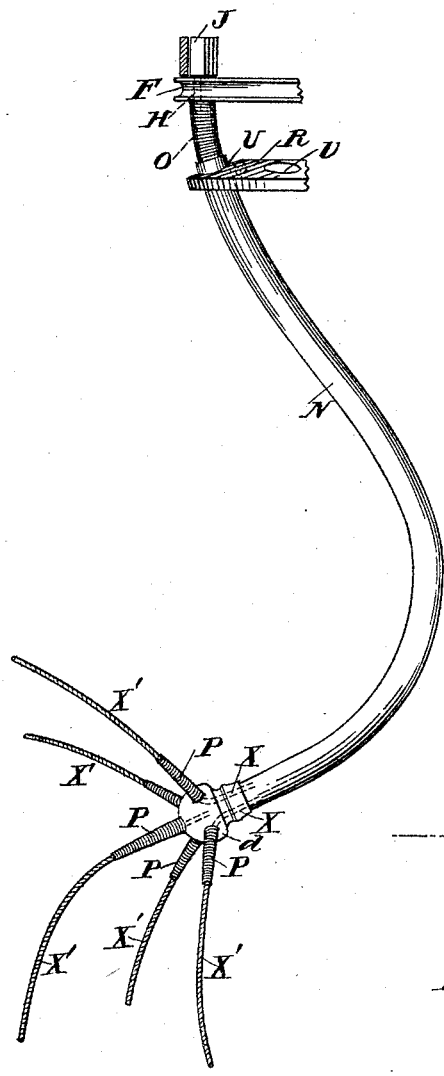
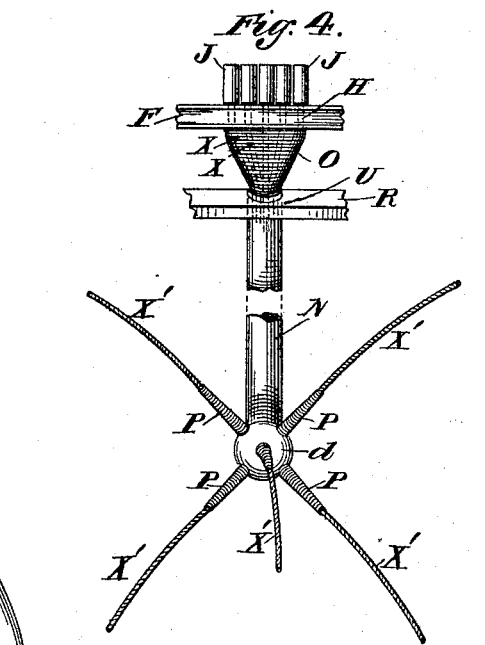
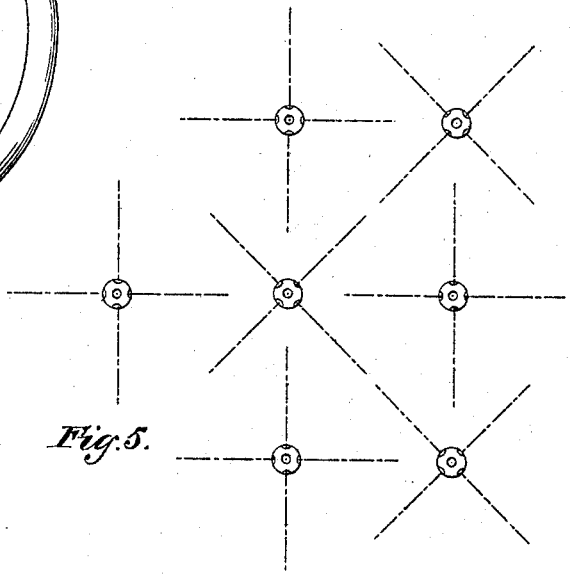
WITNESSES:
H. F. Parker.
J. Sheridan Hyde
INVENTOR
Girard Beekman
BY C. Wyllys Betts
ATTORNEY
THE NORRIS PETERS CO., PHOTO-LITHO., WASHINGTON, D. C.

(No Model.) 4 Sheets—Sheet 3.

G. BEEKMAN.
COTTON HARVESTER.

No. 436,770. Patented Sept. 23, 1890.

WITNESSES:

INVENTOR
Girard Beekman
BY C. Wyllys Betts
ATTORNEY (No Model.) 4 Sheets—Sheet 4.
G. BEEKMAN.
COTTON HARVESTER.
No. 436,770. Patented Sept. 23, 1890.
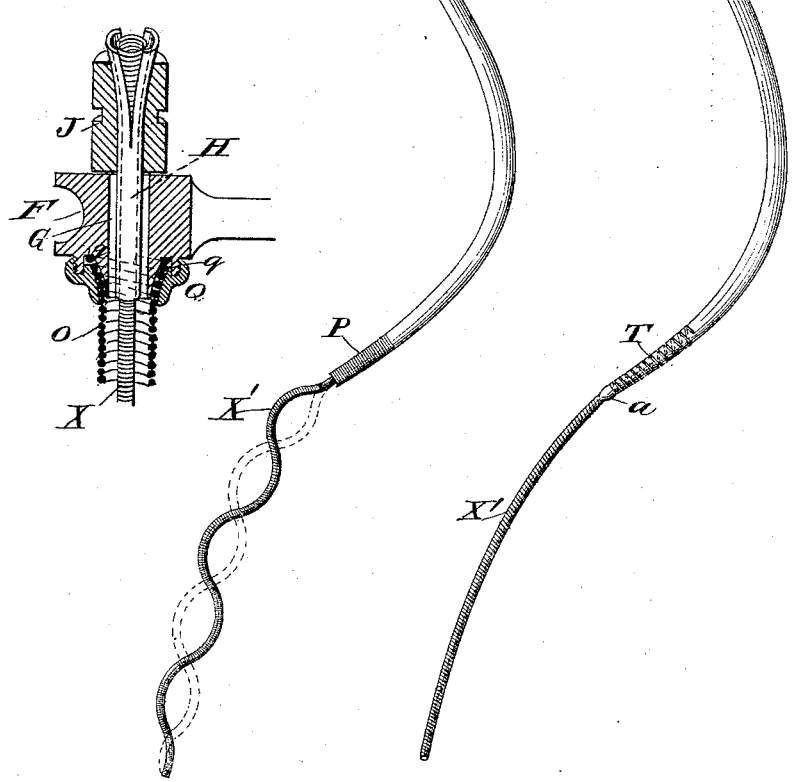
WITNESSES:
INVENTOR
Gerard Beekman
BY C. Wyllys Betts
ATTORNEY

UNITED STATES PATENT OFFICE.

GERARD BEEKMAN, OF NEW YORK, N. Y.

COTTON-HARVESTER.

SPECIFICATION forming part of Letters Patent No. 436,770, dated September 23, 1890.

Application filed February 17, 1887. Serial No. 227,897. (No model.)

*To all whom it may concern:*

Be it known that I, GERARD BEEKMAN, a citizen of the United States, residing at New York, in the county of New York and State of New York, have invented certain new and useful Improvements in Cotton-Harvesters, of which the following is a specification, reference being had therein to the accompanying drawings.

My invention relates to that class of cotton-harvesters in which the picking mechanism rotates backward at substantially the same rate of motion as the harvester moves forward over the ground; and the said invention is an improvement upon the apparatus set forth in my application for Letters Patent for cotton-harvesters filed March 2, 1886, Serial No. 193,708.

The objects of my improvements are, first, to provide an improved means of supporting the arms and pickers; second, providing a new arrangement of devices which allows the pickers to move to and from the center of the picking system as well as laterally; third, providing a new form of picker-supporting arm, and, fourth, providing improved forms of pickers. I attain these objects by the mechanism illustrated in the accompanying drawings.

Figure 1:
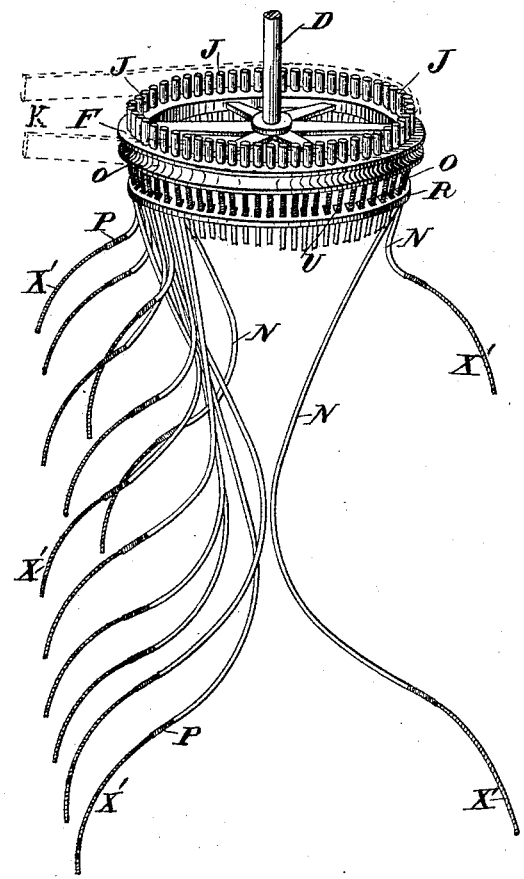
Figure 2:
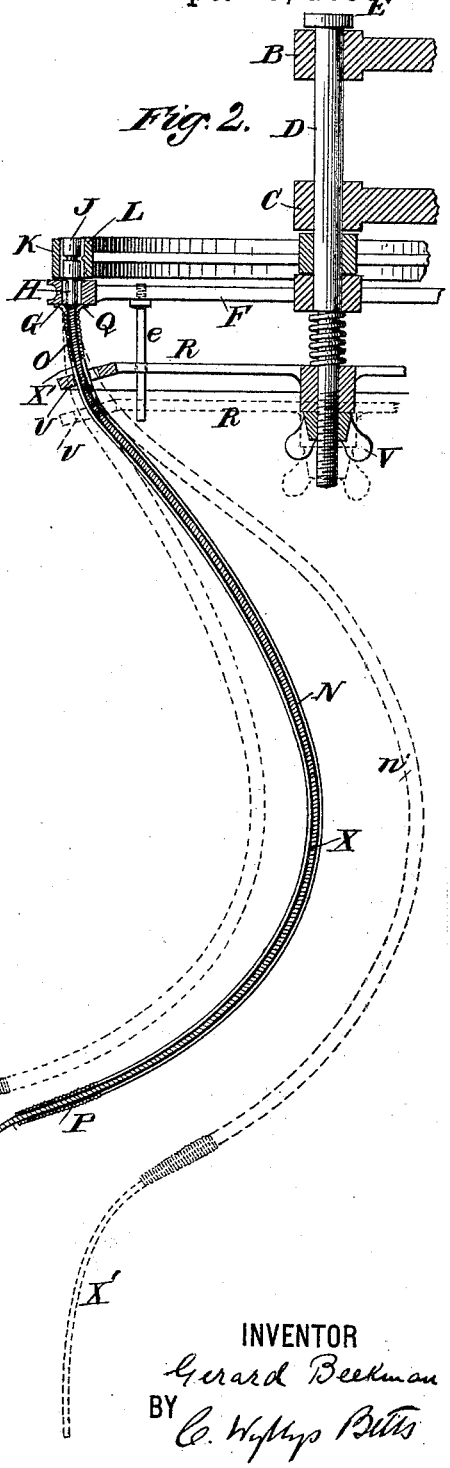
Figure 6:
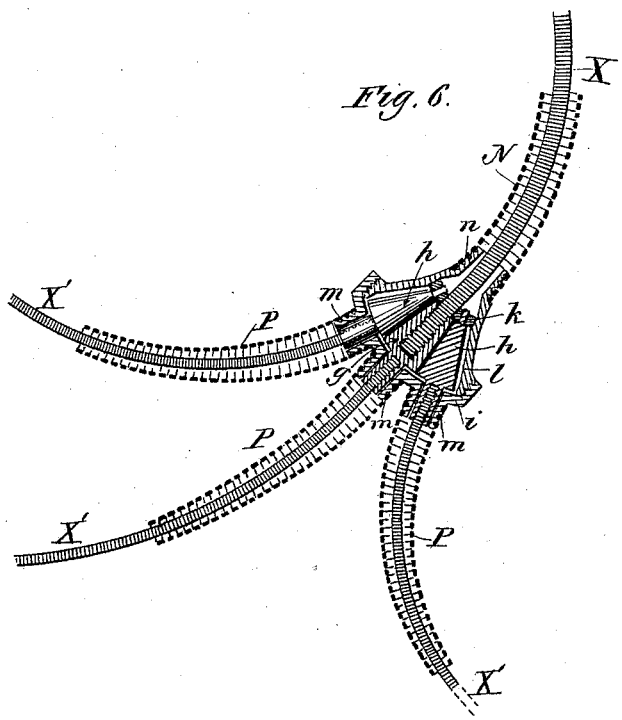
Figure 7:
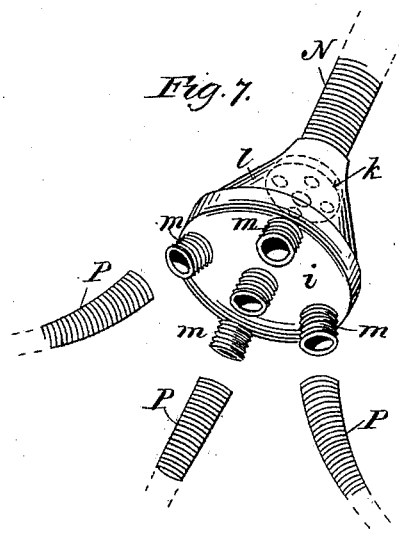

Figure 1 represents a side view in perspective of the device supporting the arms and pickers, together with the arms and pickers upon the sides of the same, the arms and pickers at the front and rear being omitted. Fig. 2 represents an enlarged side view, partly in section, of one form of improved arm and picker, with its support and means of adjustment. Figs. 3 and 4 represent enlarged side and front views in perspective of a form of arm in which several pickers are grouped. Fig. 5 represents a plan view of the arrangement of adjoining arms and pickers of the kind shown in Figs. 3 and 4. Fig. 6 represents a vertical section of a modified form of the end of an arm in which one elastic shaft sets in motion several pickers. Fig. 7 represents a perspective view of the same, the pickers being removed. Fig. 8 represents an enlarged view of the spool for rotating the elastic shafting terminating in the picker and a mode of connecting the spool with the shaft and a portion of the arm, with the device for supporting the same. Figs. 9 and 10 represent enlarged perspective views of improved forms of arms and pickers; and Fig. 11 represents an enlarged view in detail, partly in section, of a portion of the device shown in Fig. 10.

Similar letters refer to similar parts throughout the several views.

A portion of the frame of the machine terminating in a support B C is shown in Fig. 2. In the ends of this support is journaled the rod D, upon which the system of pickers is carried and rotated. The shaft D is prevented from moving downward by means of the button E at its upper end. To this rod is attached, preferably rigidly, the wheel F Fig. 1, a portion of which is shown in all the figures except Figs. 5, 6, 7, and 11. In this wheel are slots G, Figs. 2 and 8, through each of which passes the shank H of the spool J, by means of which the pickers are rotated. The said slots G are so formed that the shanks H may have a slight movement to and from the center of the wheel F, as described in my said application of March 2, 1886. The spools J are rotated by being pressed between the belt K and the idle-wheel L, Fig. 2, substantially as shown in my said application. The shanks H, working in the slots G, are thus given a very rapid rotation as the wheel F revolves. If it is desired to give more rapid rotation to the spools J, the belt K may be moved in a direction opposite to that of the wheel F by any suitable mechanism.

To each of the shanks H is attached a flexible shaft X, giving rotation to one or more pickers. Fig. 8, hereinafter described, shows one form of attachment. The flexible shafts X are each preferably composed of a fine coil of wire, substantially as shown in my said application filed March 2, 1886; but they may be composed of any other material suitable for elastic shafting.

The picker attached to the end of the flexible shaft X may be of any form of revolving picking device suitable for seizing the fibers of the cotton—such, for instance, as those described in my said application of March 2, 1886, and in Letters Patent granted to me March 3, 1885, No. 313,277, and granted December 22, 1885, No. 332,865; or it may be a wire Y, as shown in Fig. 11, or spiral spring X', such as shown in the other figures herein, which wire may be rigid or flexible, and may be covered with gutta-percha, rubber, or textile fabric Z, as shown in Fig. 11, or with any other substance which will assist the cotton in wrapping itself around the picker.

Instead of having all the flexible shafts of the picker contained in a conical drum, as shown in my application of March 2, 1886, I dispense entirely with any central drum and support the pickers by arms depending from the edge of the wheel F, as shown in the figures. By this arrangement a new capacity for motion is given to the arm of which the solid drum is not capable—namely, a motion in and out to and from the center of the picking system. Each of these arms should be sufficiently flexible to yield to the pressure of the plant and sufficiently elastic to return to its normal position when the pressure is removed. The shorter arms may be made entirely of coils of wire; but in the longer arms I prefer to have the greater part of their length rigid and composed of a curved tube N, so formed above as to recede inward from the cotton-plant and curved outward below toward the plant. By this means the picker or pickers supported by the arm will be brought into contact with the cotton between the boughs of the plant. Sufficient elasticity is given to the arm by attaching to the upper part of the tube or to both the upper and lower parts coils of wire O and P, Figs. 1, 2, 3, 4, 8, and 9, or by means of a spiral thread cut through the arm itself, forming coils, as shown at S and T, Figs. 10 and 11, or by any other suitable form of elastic tubing. At the same time the rigidity of the tube N keeps the pickers in proper position. By this means each arm may be turned to the right or left or pushed backward when coming into contact with a branch of the plant that will not itself yield, and the adjacent arms and pickers not touched by the plant will retain their normal position. When the obstruction is removed, the arm will return to its normal position. (Shown in Fig. 1.) The flexible tip P or T at the lower end of the arm, and through which the flexible shaft X passes, increases the flexibility of the device and prevents abrasion of the bush and injury to the outer end of the shaft X and to the pickers.

The upper end of the arm is coupled to the lower surface of the wheel F, being screwed fast between the loose conical ring Q, Fig. 8, and the projecting nipple q, attached to the under side of the wheel F. By unscrewing the ring Q the arm may be uncoupled from the wheel F. Thus any series of arms may be detached when only the lower or the upper parts of the plants are to be picked. Any other suitable device may be used by which the arms may be readily attached to or detached from the wheel F.

The arms may be of different lengths, as shown in Fig. 1, so that cotton growing at different heights will be more readily reached.

The picker depending from the arm N may be in spiral or wavy form, as shown in Fig. 9. It may be simply a continuation of the flexible shaft X, as shown in Figs. 1, 2, 3, and 4, or it may be a separate device attached to the shaft X at the lower end of the tube N, as shown in Figs. 10 and 11. In the latter case it may be attached by a button a, having its shank b inserted into and firmly fastened to the elastic shaft X, the end c of the picker Y being screwed into the button a. Thus the picker may be easily detached when worn out and another substituted. The picker Y may also be attached in any other suitable manner. When a separate picker is thus attached, the flexible shafting X may project beyond the end of the tube N sufficiently to give the necessary elasticity without using the elastic tip P or T at the lower end of the arm.

A single flexible shaft may be supported by each arm, as shown in Figs. 1, 2, 9, 10, and 11, or a number of shafts may be inclosed in or supported by the same arm, as shown in Figs. 3 and 4, or a single shaft may rotate a number of pickers, as shown in Figs. 6 and 7. Each shaft X terminates above in a separate spool projecting through a corresponding slot in the wheel F, Fig. 4, and when several shafts are supported by one arm I prefer to use at the lower end of the arm N a knob d, having apertures corresponding in number with the elastic shafts inclosed in or supported by the arm. To each of these apertures may be attached a wire coil or other form of elastic tip P, through which projects a picker X'. Figs. 3 and 4 show five shafts thus passing through a single arm; but I do not confine myself to any particular number of shafts. The pickers should branch from the knob d in easy lines, so as to allow easy rotation of the shafts X.

In order to enable a single flexible shaft inclosed in the elastic arm to rotate a number of pickers, a roller g, Fig. 6, in the form of the frustum of a cone, is screwed upon the lower end of the shaft X, and around this roller are grouped other conical rollers h h. Each of these rollers g and h has a picker X' screwed into its outer and lower end. The bearings of these rollers are in the concave plate i and convex plate k, Figs. 6 and 7, which are held together by the conical box l, the concave plate i being screwed upon the lower end of the conical box and the convex plate k being set in a suitable socket in the top of said box l. Below the plate i and around each of the shanks of the rollers g and h are hollow nipples m m, upon which may be screwed the flexible tips P P. The inward drag of the flexible shafting X, if made of a spiral coil, as described, will be sufficient when the parts are properly adjusted to keep the roller g constantly in contact with the rollers h h. If other shafting is used, the rollers g and h h may be covered with rubber, leather, or other suitable material to prevent slipping. The picker-supporting arm N may be attached directly to the box l by a screw-thread, as shown at n.

Thus when the elastic shaft X is rotated each of the conical rollers h h in contact with the conical roller g will also be rotated. Should one of the pickers X' be prevented from rotating freely by being twisted tightly in a ball of cotton, its conical roller h would slip without stopping the motion of the other pickers X' X', rotated by the central conical roller g. Other forms of elastic arm supporting one picker or several may be used without departing from my invention. When a number of these arms of different lengths, each supporting several pickers, depend from the wheel F, I prefer to arrange them in the manner shown in Fig. 5 or in staggered position, so that the pickers will not interfere with one another and will search every part of the plant.

A short distance below the wheel F, upon the shaft D, is the regulating-wheel R, Figs. 1, 2, 3, and 4, having slots U near the circumference corresponding in number and position with the arms N, so that each arm will pass through its corresponding slot or aperture. These slots should be longer for the short arms than for the long arms, so that the pickers will have an equal amount of inward and outward motion, but substantially no lateral motion. The length of each slot determines the amount of motion of its arm, as is shown in Fig. 2, in which the dotted arm n' shows the position when pushed as far back as the slot U will allow. These slots should be so graduated as not to permit any arm to move backward far enough to hook over any other arm.

The regulating-wheel R should be made smaller than the wheel F, and may be adjusted upon the shaft D by means of the thumb-screw V, Fig. 2, the pin e causing the two wheels to rotate together. When the wheel R is raised by the thumb-screw, the pickers will be inclined inward at a greater angle, and the size of the entire system of pickers, Fig. 1, will be decreased. This regulation of the size of the picking system allows the pickers to be brought into suitable position with reference to apparatus for removing cotton from them.

The coil O or S forms a universal joint for the arm itself, and it should be stiffer for the longer arms than for the shorter arms to compensate for the leverage of the arms.

The threads of the screws by which the various parts of the device are connected should be such that these parts will not be unscrewed by the motion of the apparatus.

What I claim as my invention, and desire to secure by Letters Patent, is—

1. In a machine for harvesting cotton, a carrying-wheel F and one or more picker-carrying arms having elastic connection at one end with the revolving carrying-wheel F, each arm carrying elastic shafting extending the entire length of said arm, said shafting being connected at one end with a rotating device and at the other end with a picker, substantially as described.

2. In a machine for harvesting cotton, a carrying-wheel F and one or more picker-supporting arms, each suspended from the wheel F by an elastic portion of said arm, in combination with the slotted regulating-wheel R, revolving with the wheel F and having slots through which the arms pass, substantially as described.

3. In a machine for harvesting cotton, a flexible shaft X, supported by a curved arm, said shaft being connected at one end to a suitable rotating device J and at the other end to the picker mechanism, substantially as described.

4. In a machine for harvesting cotton, an arm consisting of the permanently-curved tube N, the upper portion of which is flexible, in combination with the flexible shaft carried thereby and a picking device secured to the end of the shaft, substantially as described.

5. In a machine for harvesting cotton, the detachable picker, in combination with the flexible shaft X, and the button a, having a shank for securing it to the shaft and a socket for the reception of the picker, substantially as described.

6. In a machine for harvesting cotton, a flexible picking device consisting of a wire or wire spring bent into wavy or spiral form throughout its entire length and connected at one end to a suitable shaft, substantially as described.

7. In a machine for harvesting cotton, the combination of the perforated spool J, split shank H, and flexible shaft X, substantially as described.

8. In a machine for harvesting cotton, a series of curved arms arranged around a common center, the lower end of each of which projects outwardly, a flexible shaft carried by each arm, and a picker at the free end of each shaft, substantially as described.

9. In a machine for harvesting cotton, the combination, with a head or support, of a series of arms carried thereby, the free ends of which are adjustably movable toward and from a common center, and suitable picking devices carried by said arms, substantially as described.

10. In a machine for harvesting cotton, the combination, with a head or support, of a series of curved arms, the free ends of which are movable toward or from a common center, each of said arms receding inward from its upper end and curved outward at its lower or free end, and suitable picking devices carried by said arms, substantially as described.

In testimony whereof I affix my signature in presence of two witnesses.

GERARD BEEKMAN.

Witnesses:
C. WYLLYS BETTS,
J. E. HINDON HYDE.